(12) United States Patent
Wang

(10) Patent No.: US 10,558,841 B2
(45) Date of Patent: Feb. 11, 2020

(54) METHOD AND APPARATUS FOR RECOGNIZING FINGERPRINT RIDGE POINT

(71) Applicant: TENCENT TECHNOLOGY (SHENZHEN) COMPANY LIMITED, Shenzhen (CN)

(72) Inventor: Hongfa Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 113 days.

(21) Appl. No.: 15/841,055

(22) Filed: Dec. 13, 2017

(65) Prior Publication Data
US 2018/0101710 A1    Apr. 12, 2018

Related U.S. Application Data

(63) Continuation of application No. PCT/CN2016/079584, filed on Apr. 18, 2016.

(30) Foreign Application Priority Data

Sep. 8, 2015  (CN) .......................... 2015 1 0566721

(51) Int. Cl.
 *G06K 9/00* (2006.01)
 *G06T 5/20* (2006.01)

(52) U.S. Cl.
 CPC ........... *G06K 9/001* (2013.01); *G06K 9/0008* (2013.01); *G06K 9/00013* (2013.01); *G06T 5/20* (2013.01)

(58) Field of Classification Search
 CPC .. G06K 9/001; G06K 9/00067; G06K 9/4642; G06K 9/0008; G06K 9/00013; G06T 5/20
 See application file for complete search history.

(56) References Cited

U.S. PATENT DOCUMENTS 6,233,348 B1 *  5/2001  Fujii .................. G06K 9/00067
                                                      382/125
9,542,585 B2 *  1/2017  Williams
                        (Continued)

FOREIGN PATENT DOCUMENTS

CN         101079102 A     11/2007
CN         101996321 A      3/2011
                 (Continued)

OTHER PUBLICATIONS

Ratha et al., Adaptive flow orientation based feature extraction in fingerprint images, Feb. 12, 1995.*
(Continued)

*Primary Examiner* — John B Strege
(74) *Attorney, Agent, or Firm* — Anova Law Group, PLLC

(57) ABSTRACT

Embodiments of the present disclosure disclose a method for recognizing a fingerprint ridge point. The method includes performing orientation field estimation on a fingerprint image; identifying a pixel in the fingerprint image as a target pixel; determining a ridge direction of the target pixel according to the orientation field estimation, and a normal direction perpendicular to the ridge direction; defining a rectangular region by using the target pixel as a central point, a length of the rectangular region being along the ridge direction, a width of the rectangular region being along the normal direction of perpendicular to the ridge, and the rectangular region comprising multiple pixel rows; calculating a sum of grayscale values of pixels in each pixel row; and determining that the target pixel is a fingerprint ridge point when the sum of grayscale values corresponding to a pixel row that includes the target pixel is the minimum.

17 Claims, 7 Drawing Sheets

(56) References Cited

U.S. PATENT DOCUMENTS

| | | | | |
|---|---|---|---|---|
| 2004/0081360 | A1* | 4/2004 | Lee | G06K 9/4647 |
| | | | | 382/209 |
| 2005/0207627 | A1* | 9/2005 | Lee | G06K 9/00067 |
| | | | | 382/124 |
| 2005/0264878 | A1* | 12/2005 | Plummer | G02B 5/04 |
| | | | | 359/387 |
| 2006/0153431 | A1* | 7/2006 | Ando | G06K 9/00067 |
| | | | | 382/124 |
| 2015/0063699 | A1* | 3/2015 | Wu | G06K 9/344 |
| | | | | 382/176 |
| 2018/0018497 | A1* | 1/2018 | Zheng | G06T 7/73 |
| 2018/0089484 | A1* | 3/2018 | Satou | A61B 5/117 |

FOREIGN PATENT DOCUMENTS

| | | |
|---|---|---|
| CN | 102510330 A | 6/2012 |
| EP | 2104059 B1 | 1/2011 |
| KR | 100391182 A | 7/2003 |

OTHER PUBLICATIONS

The World Intellectual Property Organization (WIPO) International Search Report for PCT/CN2016/079584 dated Jul. 20, 2016 5 Pages (including translation).
Korean Intellectual Property Office (KIPO) Office Action 1 for 10-2017-7035024 dated Apr. 14, 2018 11 Pages (including translation).

\* cited by examiner

METHOD AND APPARATUS FOR RECOGNIZING FINGERPRINT RIDGE POINT

RELATED APPLICATION

This application claims priority to PCT application No. PCT/CN2016/079584, filed on Apr. 18, 2016, which claims priority to Chinese Patent Application No. 201510566721.3, entitled "METHOD AND APPARATUS FOR RECOGNIZING FINGERPRINT RIDGE POINT" filed on Sep. 8, 2015. Both applications are incorporated by reference in the entirety.

FIELD OF THE TECHNOLOGY

The present disclosure relates to the field of image recognition technologies, and in particular, to a method and an apparatus for recognizing fingerprint ridge points.

BACKGROUND OF THE DISCLOSURE

Fingerprints are unique, convenient to be checked, and durable over the life of an individual, and therefore have become a primary means for biometric identification. After centuries of development, fingerprint recognition has becomes a very important technology of identity authentication. A fingerprint consists of ridges on the epidermis at the end of a person's finger. Two fingerprints usually have same general features, but minutia features of the two fingerprints would not be identical. Fingerprint ridges are not continuous, smooth or straight, but instead they are often terminal, bifurcated or bent. These ridge endings, bifurcations points, and bending points are referred to as "feature points". Fingerprint recognition is a technology of performing identity authentication by comparing feature points of different fingerprints.

SUMMARY

To improve accuracy of fingerprint recognition by obtaining better a binarized fingerprint image based on Gabor filters, a method for recognizing a fingerprint ridge point is particularly provided.

One aspect of the present disclosure provides a method for recognizing a fingerprint ridge point. The method includes receiving an input fingerprint image; performing orientation field estimation on the fingerprint image; identifying a pixel in the fingerprint image as a target pixel; determining a ridge direction of the target pixel, obtained according to the orientation field estimation, and a normal direction perpendicular to the ridge direction; defining a rectangular region by using the target pixel as a central point, a length of the rectangular region being along the ridge direction, a width of the rectangular region being along the normal direction of perpendicular to the ridge, and the rectangular region comprising multiple pixel rows arranged in the normal direction; calculating a sum of grayscale values of pixels in each pixel row; and determining that the target pixel is a fingerprint ridge point when the sum of grayscale values corresponding to a pixel row that includes the target pixel is the minimum.

Another aspect of the present disclosure provides an apparatus for recognizing a fingerprint ridge point. The apparatus includes: a module for receiving a fingerprint image, configured to: receive an input fingerprint image, and perform orientation field estimation on the fingerprint image; a module for determining a pixel direction, configured to: traverse a pixel in the fingerprint image as a target pixel, and determine a ridge direction of the target pixel according to the orientation field estimation, and a normal direction perpendicular to the ridge direction; a module for selecting a reference pixel, configured to define a rectangular region by using the target pixel as a central point, a length of the rectangular region being along the ridge direction, a width of the rectangular region being along the normal direction of perpendicular to the ridge, and the rectangular region comprising multiple pixel rows arranged in the normal direction; and a module for determining a fingerprint ridge point, configured to: calculate a sum of grayscale values of pixels in each pixel row, and determine that the target pixel is a fingerprint ridge point when a sum of grayscale values corresponding to a pixel row that comprises the target pixel is the minimum.

Another aspect of the present disclosure provides a computer readable media containing program instructions, when executed by one or more processor, the programs instructions perform a method for recognizing a fingerprint ridge point. The method includes: performing orientation field estimation on a fingerprint image; identifying a pixel in the fingerprint image as a target pixel; determining a ridge direction of the target pixel, obtained according to the orientation field estimation, and a normal direction perpendicular to the ridge direction; defining a rectangular region by using the target pixel as a central point, a length of the rectangular region being along the ridge direction, a width of the rectangular region being along the normal direction of perpendicular to the ridge, and the rectangular region comprising multiple pixel rows arranged in the normal direction; calculating a sum of grayscale values of pixels in each pixel row; and determining that the target pixel is a fingerprint ridge point when the sum of grayscale values corresponding to a pixel row that includes the target pixel is the minimum.

By means of the foregoing method and the apparatus for recognizing a fingerprint ridge point, during binarization of a fingerprint image, pixels in the fingerprint image are traversed. A rectangular region is defined by using a traversed pixel as a central point. Lengthwise and widthwise extending directions of the rectangular region are respectively corresponding to a ridge direction and a normal direction of a target pixel, and the rectangular region includes multiple pixel rows arranged in the normal direction. A sum of grayscale values of pixels in each pixel row is calculated, and it is determined that the target pixel is a fingerprint ridge point when a sum of grayscale values corresponding to a pixel row that includes the target pixel is the minimum. Compared with a method of using a filter or threshold filtering, both a grayscale value of a traversed pixel and a grayscale value of a pixel at an adjacent position of the traversed pixel are used as references, so that incorrectly determined noise is effectively eliminated, and recognition accuracy is improved.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Detection of feature points in fingerprint recognition often depends on detection of fingerprint ridges. That is, the feature points are obtained by analyzing the fingerprint ridges. A collected fingerprint image is binarized to obtain fingerprint ridges according to the fingerprint image. Often, black pixels are used for fingerprint ridge points, and white pixels are used for background regions on two sides of fingerprint ridges, thereby facilitating recognition of feature points of a fingerprint.

Further, the binarization methods usually include a local binarization method based on Gabor filters and the like. When a method based on Gabor filters is used, local directions and ridge frequencies need to be accurately calculated. However, it is relatively difficult to accurately calculate local directions and ridge frequencies when preprocessing of some low-quality fingerprint images.

In one embodiment of the present disclosure, a method for recognizing a fingerprint ridge point is provided. The method may be implemented by using a computer, and may be performed on a computer system that is based on the von Neumann architecture. The computer program may be a fingerprint recognition program. The computer system may be a terminal device such as a smartphone, a tablet computer, a palmtop computer, a notebook computer or a personal computer on which a fingerprint sensor is installed.

Figure 1:
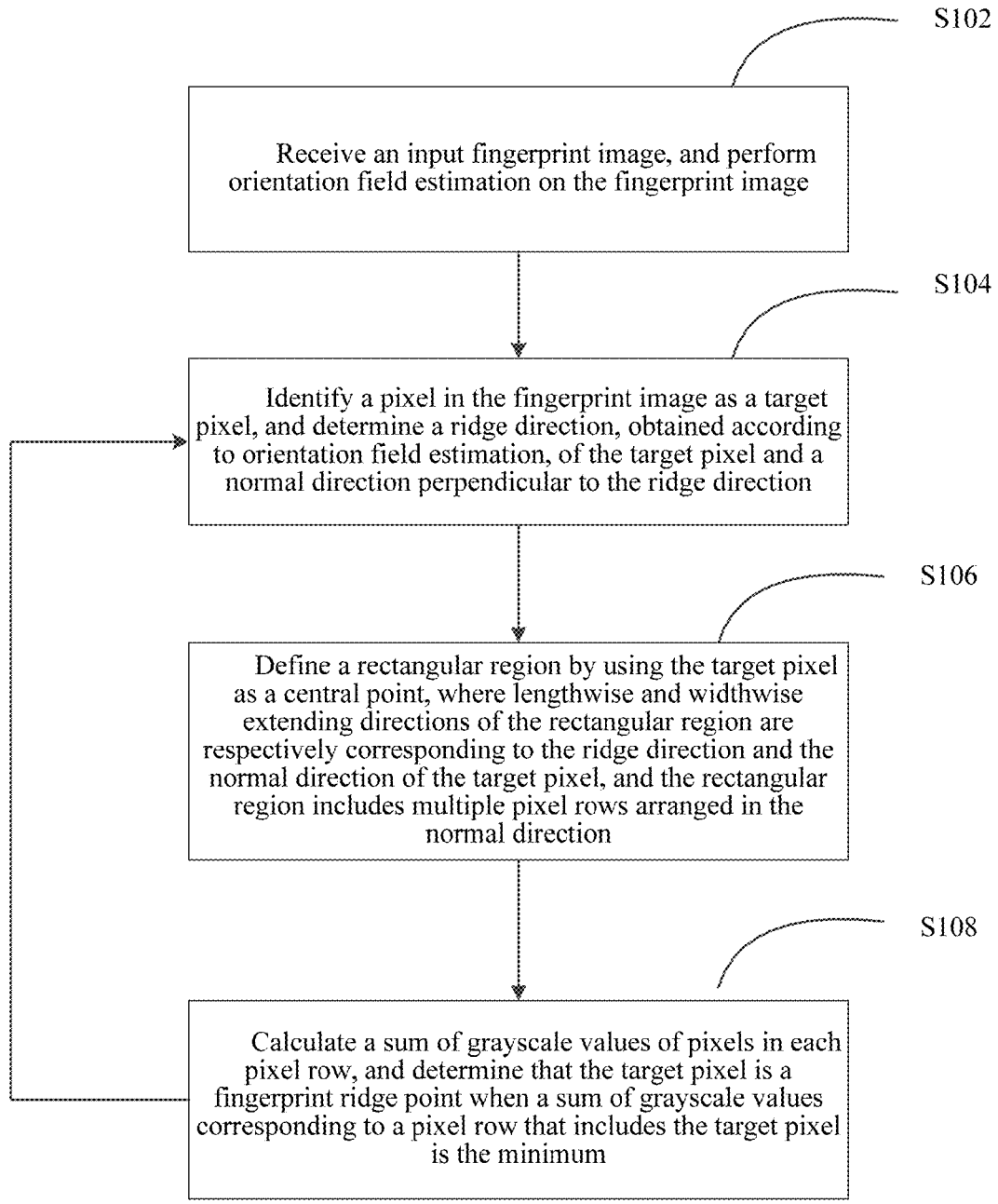
FIG. 1 is a flowchart of a method for recognizing a fingerprint ridge point according to an embodiment.

Specifically, as shown in FIG. 1, the method includes the following steps.

Step S102: Receive an input fingerprint image, and perform orientation field estimation on the fingerprint image.

Step S104: Identify a pixel in the fingerprint image as a target pixel, and determine a ridge direction, of the target pixel according to orientation field estimation and a normal direction perpendicular to the ridge direction.

In this embodiment, the fingerprint image may be collected by using a camera or other fingerprint image capturing devices. A user may put a finger on a glass panel of a fingerprint sensor, and an image collection device located below the glass panel may obtain a fingerprint image of the finger. In another embodiment, a fingerprint image photographed by another device may be received, and fingerprint recognition can be performed on the obtained fingerprint image.

In one embodiment, after the fingerprint image is collected, illumination normalization is first performed on the fingerprint image. An objective of illumination normalization is to eliminate the impact of light on the fingerprint image during collection of the fingerprint image. That is, during collection of the fingerprint image, due to different light source locations or light intensities, some regions of the collected fingerprint image are relatively bright and some other regions are relatively dark, or the entire fingerprint image is relatively bright or dark. After illumination normalization is performed, the relatively bright or dark regions may be corrected, thereby eliminating the impact of light on the collected fingerprint image. In this embodiment, illumination normalization may be implemented by using a method based on a feature subspace or a correction method based on histogram equalization.

Orientation field estimation of the fingerprint image may be used to determine direction information of a ridge that passes through each pixel in the fingerprint image. In this embodiment, the direction information of each point may be calculated based on gradient distribution of grayscale values of pixels. For example, if a difference between a grayscale value of a pixel and a grayscale value of a pixel adjacent to the pixel on the left or right side is relatively small, and a difference between the grayscale value of the pixel and a grayscale value of a pixel adjacent to the pixel on the upper or lower side is relatively large, a ridge direction is a horizontal direction from the left side to the right side of the pixel, and a normal direction perpendicular to the ridge direction is a vertical direction from the upper side to the lower side of the pixel.

Step S106: Define a rectangular region by using the target pixel as a central point, where lengthwise and widthwise extending directions of the rectangular region are respectively corresponding to the ridge direction and the normal direction of the target pixel, and the rectangular region includes multiple pixel rows arranged in the normal direction.

Figure 2:
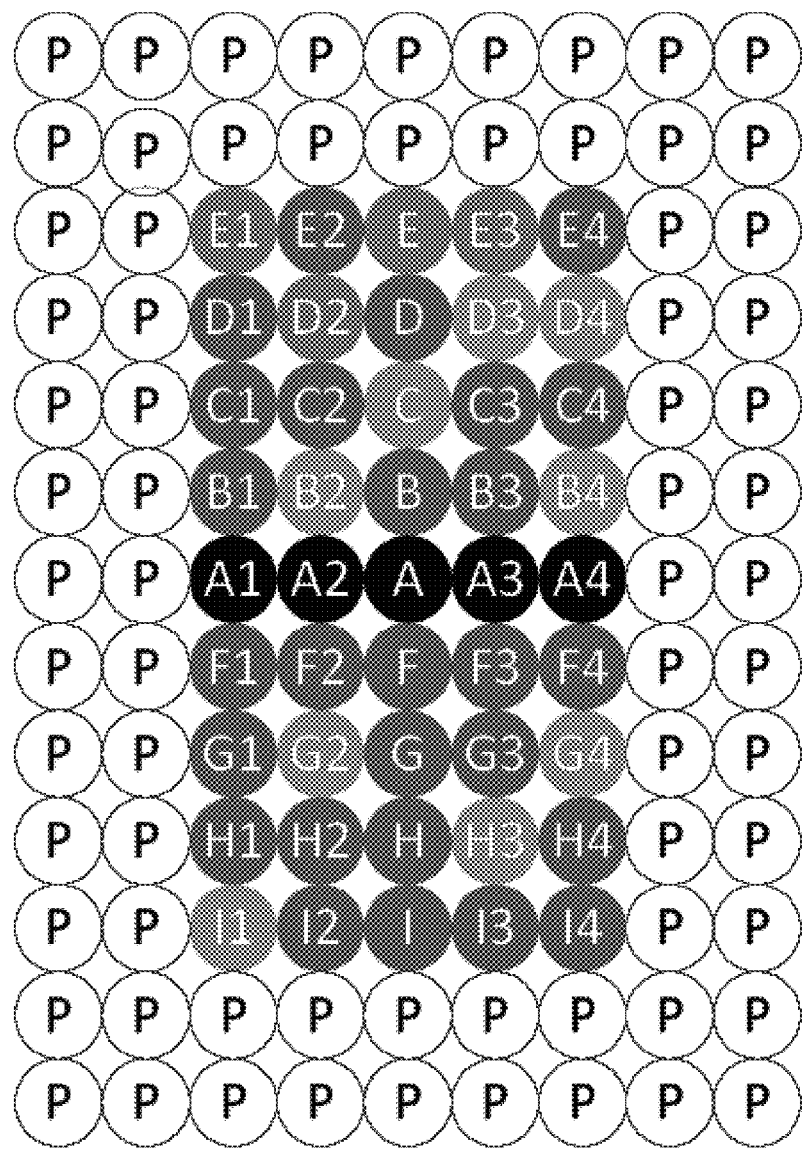
FIG. 2 is a schematic diagram of defining a rectangular region by using a target pixel as a central point according to an embodiment.

As shown in FIG. 2, a fingerprint image includes multiple pixels. When a pixel A is traversed, the pixel A is identified as a target pixel. A direction formed by connecting pixels A1, A2, A, A3, and A4 is a ridge direction of the pixel A obtained by performing orientation field estimation on the pixel A. A direction formed by connecting E, D, C, B, F, G, H, and I is a normal direction of the pixel A obtained by performing orientation field estimation on the pixel A. The ridge direction of the pixel A is perpendicular to the normal direction of the pixel A.

In this embodiment, a rectangular region defined by using the pixel A as a central point is a rectangular region formed by using E1, E4, 14, and I1 as vertices. Four sides of the rectangular region are: a long side formed by connecting pixels E1, D1, C1, B1, F1, G1, H1, and I1, a short side formed by connecting pixels E1, E2, E, E3, and E4, a long side formed by connecting pixels E4, D4, C4, B4, F4, G4, H4, and I4, and a short side formed by connecting pixels I1, I2, E, I3, and I4.

As shown in FIG. 2, multiple pixel rows arranged in the normal direction of the pixel A in the rectangle (E1, E4, I4, I1) includes:

a first pixel row: E1, E2, E, E3, and E4;
a second pixel row: D1, D2, D, D3, and D4;
a third pixel row: C1, C2, C, C3, and C4;
. . .
a ninth pixel row: I1, I2, I, I3, and I4.

Step S108: Calculate a sum of grayscale values of pixels in each pixel row, and determine that the target pixel is a fingerprint ridge point when a sum of grayscale values corresponding to a pixel row that includes the target pixel is the minimum.

Figure 3:
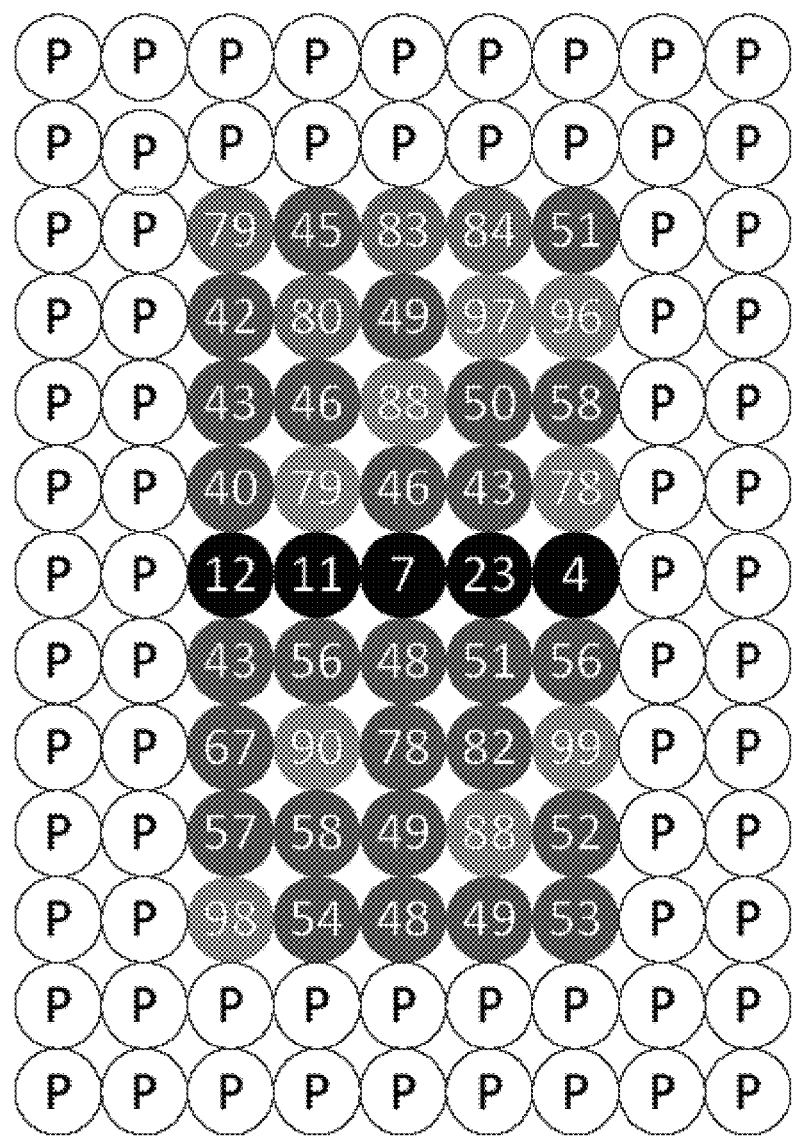
FIG. 3 is a schematic diagram of a grayscale value of each pixel in a pixel row in a rectangular region according to an embodiment.

As shown in FIG. 3, grayscale values of pixels included in the rectangle (E1, E4, I4, I1) in FIG. 2, and a sum of grayscale values of each pixel row is calculated:

a sum of grayscale values of the first pixel row E1, E2, E, E3, and E4 is 79+45+83+84+51=342;
a sum of grayscale values of the second pixel row D1, D2, D, and D3 is 42+80+49+97+96=364;
a sum of grayscale values of the third pixel row C1, C2, C, C3, and C4 is 43+46+88+50+58=285;
. . .
a sum of grayscale values of the fifth pixel row A1, A2, A, A3, and A4 is 12+11+7+23+4=57;
. . .
a sum of grayscale values of the ninth pixel row I1, I2, I, I3, and I4 is 98+54+48+49+53=302.

By means of comparison, it may be learned that, the sum of grayscale values of the pixels in the fifth pixel row is 57, and the fifth pixel row includes a target pixel A. That is, the sum of grayscale values corresponding to the pixel row that includes the target pixel A is the minimum of the sums of grayscale values corresponding to all the pixel rows. Therefore, it is determined that the target pixel A is a fingerprint ridge point.

The pixels A1, A2, A3, and A4 in the fifth pixel row are all pixels in the ridge direction of the target pixel A. Pixels in another pixel row, for example, B1, B2, B, B3, and B4 in the fourth pixel row, are also in the ridge direction, and form a pixel row that is adjacent and parallel to the fifth pixel row in the normal direction. If the sum of grayscale values of the pixels in the fifth pixel row is less than the sum of grayscale values of the pixels in the fourth pixel row, it indicates that the color of the pixels in the fifth pixel row is generally darker than the color of the pixels in the fourth pixel row, so that the fifth pixel row better meets a feature of a fingerprint ridge. Therefore, a candidate fingerprint ridge formed by the fifth pixel row is definitely chosen over a candidate fingerprint ridge formed by the fourth pixel row as a fingerprint ridge. The target pixel A can be determined as a fingerprint ridge point in the fingerprint ridge.

In addition, in this embodiment, the rectangular region is defined, and the sums of grayscale values of the pixel rows are calculated and compared. Therefore, during determining of a fingerprint ridge point, not only the grayscale value of the target pixel A is used as a determining basis, but also a grayscale value of a pixel adjacent to the target pixel A in the ridge direction is used as a reference. For example, if a grayscale value of the target pixel A is relatively large but the grayscale values of A1, A2, A3, and A4 are relatively small, a general sum of grayscale values of the fifth pixel row is relatively small. This indicates that the target pixel A may be noise data, but the target pixel A may still be determined as a fingerprint ridge point. Therefore, interference from noise is eliminated, and recognition accuracy is improved.

Figure 4:
FIG. 4 is a schematic diagram of a received fingerprint image according to an embodiment.
Figure 5:
FIG. 5 is a schematic diagram of a binarized fingerprint ridge image has been performed according to an embodiment.

As described above, after step S104 to step S108 are sequentially performed until pixels in the entire fingerprint image are traversed, fingerprint ridge points included in the fingerprint image can be determined. Grayscale values of fingerprint ridge points are set to a relatively large value (for example, 255), and grayscale values of pixels that are not fingerprint ridge points in the fingerprint image are set to a relatively small value (for example, 0), so that the fingerprint image is binarized, thereby facilitating the following recognition process of features included in the fingerprint image. For example, as shown in FIG. 4 and FIG. 5, FIG. 4 shows an input fingerprint image, FIG. 5 is a binarized image generated by traversing all pixels in the input fingerprint image. A grayscale value of a fingerprint ridge point is 255, and a grayscale value of a non-fingerprint ridge point is 0 (that is, color negative processing is performed).

Further, in this embodiment, the length of a long side of a rectangle may be set in advance. Specifically, the step of defining a rectangular region by using the target pixel as a central point is: calculating an average ridge distance of the fingerprint image; and setting a first quantity of the pixel rows according to the average ridge distance.

Figure 6:
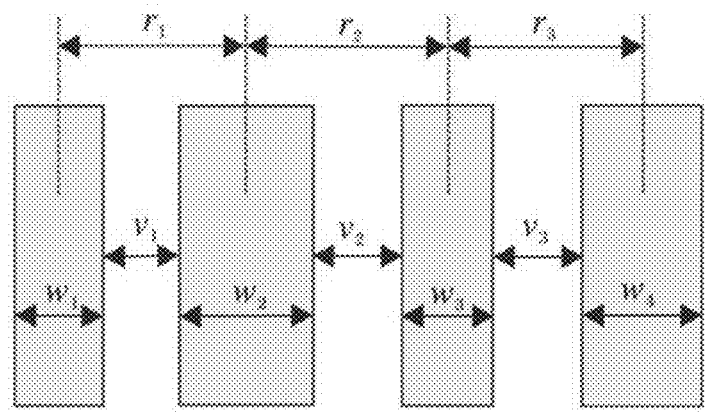
FIG. 6 is a schematic diagram of the definition of a ridge distance according to an embodiment.

As shown in FIG. 6, a distance between a ridge and an adjacent furrow of a fingerprint is usually defined as a fingerprint ridge distance. From the perspective of technology implementation, the length between the center of a ridge and the center of a furrow is usually calculated as the ridge distance. It is assumed that there are n ridges whose widths are respectively $w_1, \ldots, w_n$ in the fingerprint image, and the ridges are defined separated by n-1 furrows whose widths are $v_1, \ldots, v_n$. As shown in FIG. 6, the ridge distance is calculated as follows:

$$r_i = w_i/2 + v_i + w_{i+1}/2.$$

The average ridge distance (the ridge distance for short hereinafter) of the fingerprint image refers to an average value of ridge distances in a particular region. Generally, the size of a ridge distance depends on a structure of the fingerprint and the resolution of image collection. In the fingerprint image, when a ridge distance is larger, it indicates that ridges there are sparser. In contrast, when a ridge distance is smaller, it indicates that ridges there are denser. Alternatively, the average ridge distance may be obtained by estimating ridge frequency.

Methods for estimating the ridge distance include a geometric method and a spectral analysis method. A method proposed by Yilong Yin may be used, and in the method, a ridge distance is estimated based on a statistics window. Alternatively, a method proposed by En Zhu may be used, and in the method, local regions are projected on a curve that passes through the centers of the regions, where tangential directions of all points are perpendicular to the ridge direction. In this way, the average ridge distance of the entire image is calculated.

In this embodiment, after the average ridge distance is estimated (the average ridge distance may be denoted by using a quantity of pixels), the setting a first quantity of the pixel rows according to the average ridge distance may be specifically: setting the first quantity of the pixel rows to be less than a quantity of pixels corresponding to the average ridge distance.

Referring to FIG. 2, FIG. 3, and FIG. 6, if the first quantity of the pixel rows is set to be relatively large, the defined rectangular region extends greatly in the normal direction of the target pixel A. In this case, the rectangular region may extend across two ridges. Consequently, pixels in a paralleled fingerprint ridge affect the determining of the target pixel A. After the first quantity of the pixel rows is set as the quantity of the pixels corresponding to the average ridge distance, the defined rectangular region may not cover multiple ridges in the normal direction of the target pixel A. Therefore, interference from another ridge is eliminated, and the accuracy of a binarized image is improved.

Correspondingly, in this embodiment, after the step of setting a quantity of the pixel rows according to a ridge interval length, a second quantity of pixels included in each pixel row may be set according to a quantity of the pixel rows. A value of the second quantity may be ⅓ to ⅔ of that of the first quantity.

That is, when the rectangular region is defined according to the target pixel, a quantity of pixels selected in the ridge direction of the target pixel may be less than pixels selected in the normal direction of the target pixel. That is, a side, extending in the normal direction of the target pixel, of the rectangular region is the long side of the rectangular region, and a side, extending in the ridge direction of the target pixel, of the rectangular region is the short side of the rectangular region. The length of the short side may be selected to be between ⅓ and ⅔ of the length of the long side.

If the second quantity is set to be relatively large, determining of a target pixel at a position where a fingerprint ridge bends sharply is easily interfered with by another fingerprint ridge point in the bent ridge. If the second quantity is set to be relatively small, a quantity of adjacent reference pixels on which the determining of the target pixel that is incorrectly collected as noise depends is reduced. Therefore, the target pixel that is incorrectly collected as the digital noise is easily ignored. If the value of the second quantity is set to be ⅓ to ⅔ of that of the first quantity, a balance can be reached between the first quantity and the second quantity, so that the accuracy of binarization is improved.

Figure 7:
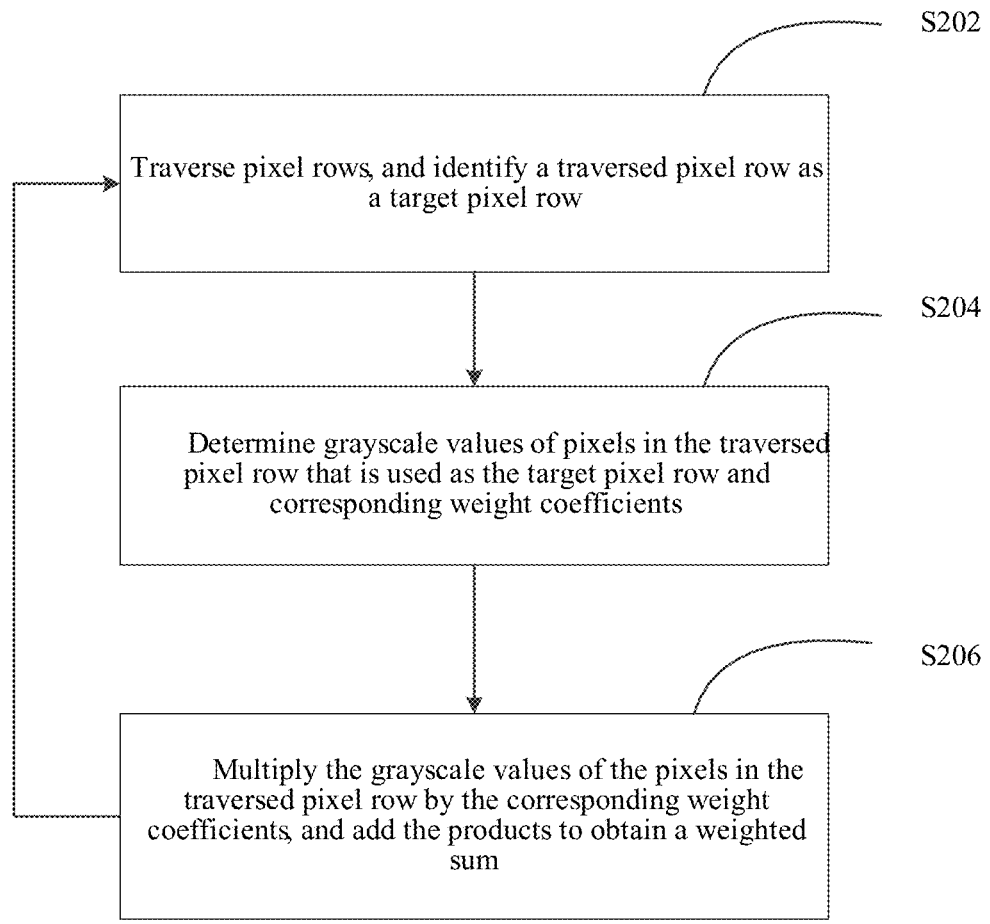
FIG. 7 is a flowchart of a process of calculating a weighted sum as a sum of grayscale values of pixels in a pixel row according to an embodiment.

In one embodiment, during calculation of a sum of grayscale values of pixels in each pixel row, instead of using an algebraic sum method to calculate the sum of grayscale values of pixels in the pixel row, a corresponding weight coefficient is set for each pixel in the pixel row, and a weighted sum is calculated according to weight coefficients as the sum of grayscale values of pixels in the pixel row. Specifically, as shown in FIG. 7, the method includes the following steps.

Step S202: Traverse pixel rows, and identify a traversed pixel row as a target pixel row.

Step S204: Determine grayscale values of pixels in the traversed pixel row that is used as the target pixel row and corresponding weight coefficients.

Step S206: Multiply the grayscale values of the pixels in the traversed pixel row by the corresponding weight coefficients, and add the products to obtain a weighted sum.

For example, as shown in FIG. 3, for the first pixel row E1, E2, E, E3, and E4, if a weight coefficient corresponding to E1 and E4 is $b_1$, a weight coefficient corresponding to E2 and E3 is $b_2$, and a weight coefficient corresponding to E is $b_3$, the sum of grayscale values of the first pixel row E1, E2, E, E3, and E4 is:

$79 \times b_1 + 45 \times b_2 + 83 \times b_3 + 84 \times b_2 + 51 \times b_1$.

An appropriate weight coefficient is set in advance for a pixel at each position in the pixel row, so that proportions accounted for by the grayscale value of each pixel in the calculated sum of grayscale values of the pixel row may be changed, and the pixels at some positions in the pixel row may have a greater impact on the sum of grayscale values of the entire pixel row.

In one embodiment, the weight coefficients of the pixels in the target pixel row decrement with a distance from a central pixel in the target pixel row.

In the foregoing example, compared with E1 and E4, E2 and E3 have a relatively strong impact on determining of whether E is a fingerprint ridge point. Therefore, the weight coefficient $b_1$ corresponding to E1 and E4 may be set to be less than the weight coefficient $b_2$ corresponding to E2 and E3. Compared with E2 and E3, the grayscale value of E has a relatively strong impact on determining of whether E is a fingerprint ridge point. Therefore, the weight coefficient $b_2$ corresponding to E2 and E3 may be set to be less than the weight coefficient $b_3$ corresponding to E.

The weight coefficient of each pixel in the target pixel row is set in a manner in which weight coefficients decrement with a distance from the central pixel in the target pixel row. In this case, a grayscale value of a pixel that is relatively close to the central pixel in the target pixel row (that is, the pixel and the target pixel are both in the normal direction of the target pixel) may have a relatively large impact on the sum of grayscale values of the target pixel row, and a grayscale value of a pixel that is relatively far from the central pixel in the target pixel row is enabled to have a relatively small impact on the sum of grayscale values of the target pixel row, thereby improving determining accuracy.

In one embodiment, after the step of identifying a pixel in the fingerprint image as a target pixel, a grayscale value of the target pixel may be determined. It is determined whether the grayscale value of the target pixel is greater than a threshold. If the grayscale value is greater than the threshold, it is determined that the target pixel is not a fingerprint ridge point.

That is, pre-estimation may be performed on the fingerprint image to directly determine that a pixel that clearly has a relatively large grayscale value is not a fingerprint ridge point. Therefore, the step of defining a rectangular region is omitted, thereby increasing a recognition speed.

Figure 8:
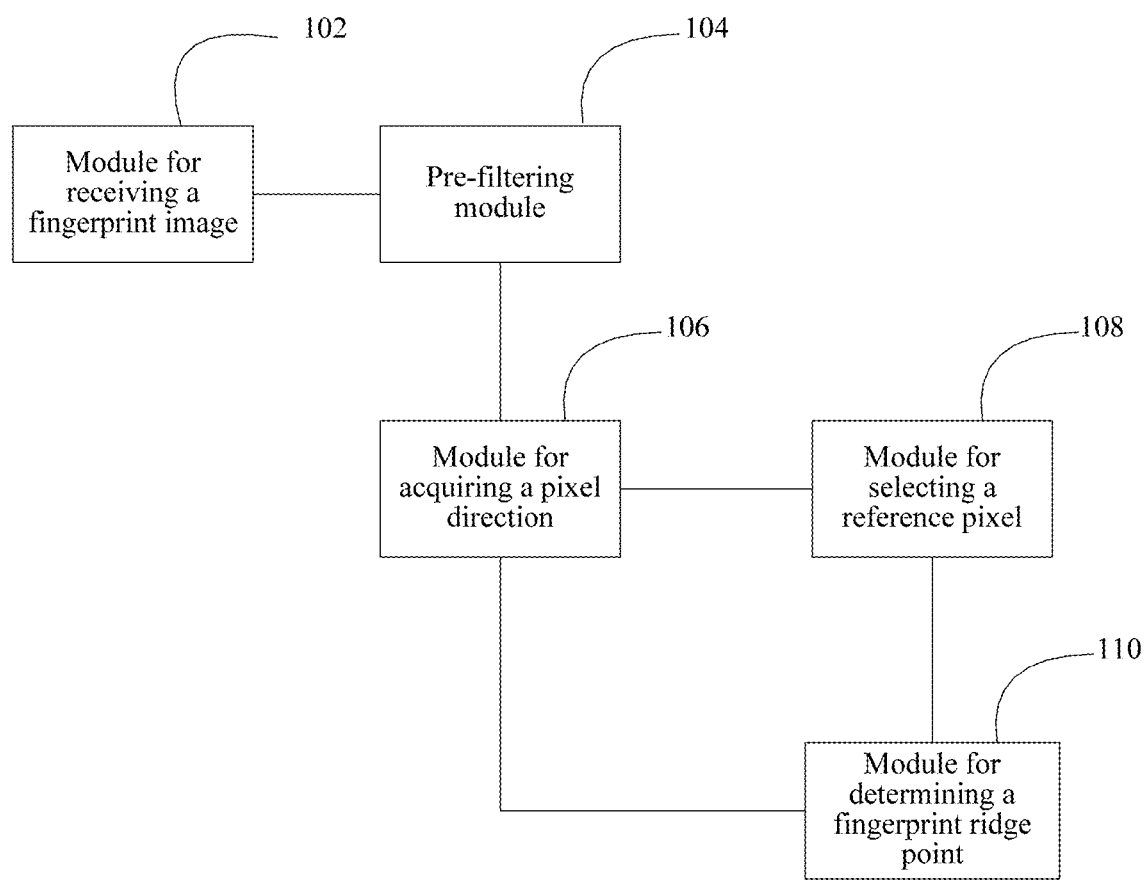
FIG. 8 is a schematic diagram of an apparatus for recognizing a fingerprint ridge point according to an embodiment.

To improve accuracy of fingerprint recognition, in an embodiment, as shown in FIG. 8, an apparatus for recognizing a fingerprint ridge point is further provided. The apparatus includes a module for receiving a fingerprint image 102, a module for acquiring a pixel direction 104, a module for selecting a reference pixel 106, and a module for determining a fingerprint ridge point 108.

The module for receiving a fingerprint image 102 is configured to: receive an input fingerprint image, and perform orientation field estimation on the fingerprint image.

The module for acquiring a pixel direction 104 is configured to: traverse a pixel in the fingerprint image as a target pixel, and determine a ridge direction, obtained according to orientation field estimation, of the target pixel and a normal direction perpendicular to the ridge direction.

The module for selecting a reference pixel 106 is configured to: define a rectangular region by using the target pixel as a central point, where lengthwise and widthwise extending directions of the rectangular region are respectively corresponding to the ridge direction and the normal direction of the target pixel, and the rectangular region includes multiple pixel rows arranged in the normal direction.

The module for determining a fingerprint ridge point 108 is configured to: calculate a sum of grayscale values of pixels in each pixel row, and determine that the target pixel is a fingerprint ridge point when a sum of grayscale values corresponding to a pixel row that includes the target pixel is the minimum.

In this embodiment, the module for selecting a reference pixel 106 is further configured to: calculate an average ridge distance of the fingerprint image, and set a first quantity of the pixel rows according to the average ridge distance.

In this embodiment, the module for selecting a reference pixel 106 is further configured to set, according to a quantity of the pixel rows, a second quantity of pixels included in each pixel row, where a value of the second quantity is ⅓ to ⅔ of that of the first quantity.

In this embodiment, the module for determining a fingerprint ridge point 108 is further configured to: traverse pixel rows, and identify a traversed pixel row as a target pixel row; determine grayscale values of pixels in the traversed pixel row that is used as the target pixel row and corresponding weight coefficients; and multiply the grayscale values of the pixels in the traversed pixel row by the corresponding weight coefficients, and add the products to obtain a weighted sum.

In this embodiment, as shown in FIG. 8, the apparatus for recognizing a fingerprint ridge point further includes a pre-filtering module 110, configured to: determine a grayscale value of the target pixel; determine whether the grayscale value of the target pixel is greater than a threshold; and if the grayscale value is greater than the threshold, determine that the target pixel is not a fingerprint ridge point.

By means of the method and the apparatus for recognizing a fingerprint ridge point, during binarization of a fingerprint image, pixels in the fingerprint image are traversed. A rectangular region is defined by using a traversed pixel as a central point. Lengthwise and widthwise extending directions of the rectangular region are respectively corresponding to a ridge direction and a normal direction of a target pixel, and the rectangular region includes multiple pixel rows arranged in the normal direction. A sum of grayscale values of pixels in each pixel row is calculated, and it is determined that the target pixel is a fingerprint ridge point when a sum of grayscale values corresponding to a pixel row that includes the target pixel is the minimum. Compared with a method of using a filter or threshold filtering, both a grayscale value of a traversed pixel and a grayscale value of a pixel at an adjacent position of the traversed pixel are used as references, so that incorrectly determined noise is effectively eliminated, and recognition accuracy is improved.

Figure 9:
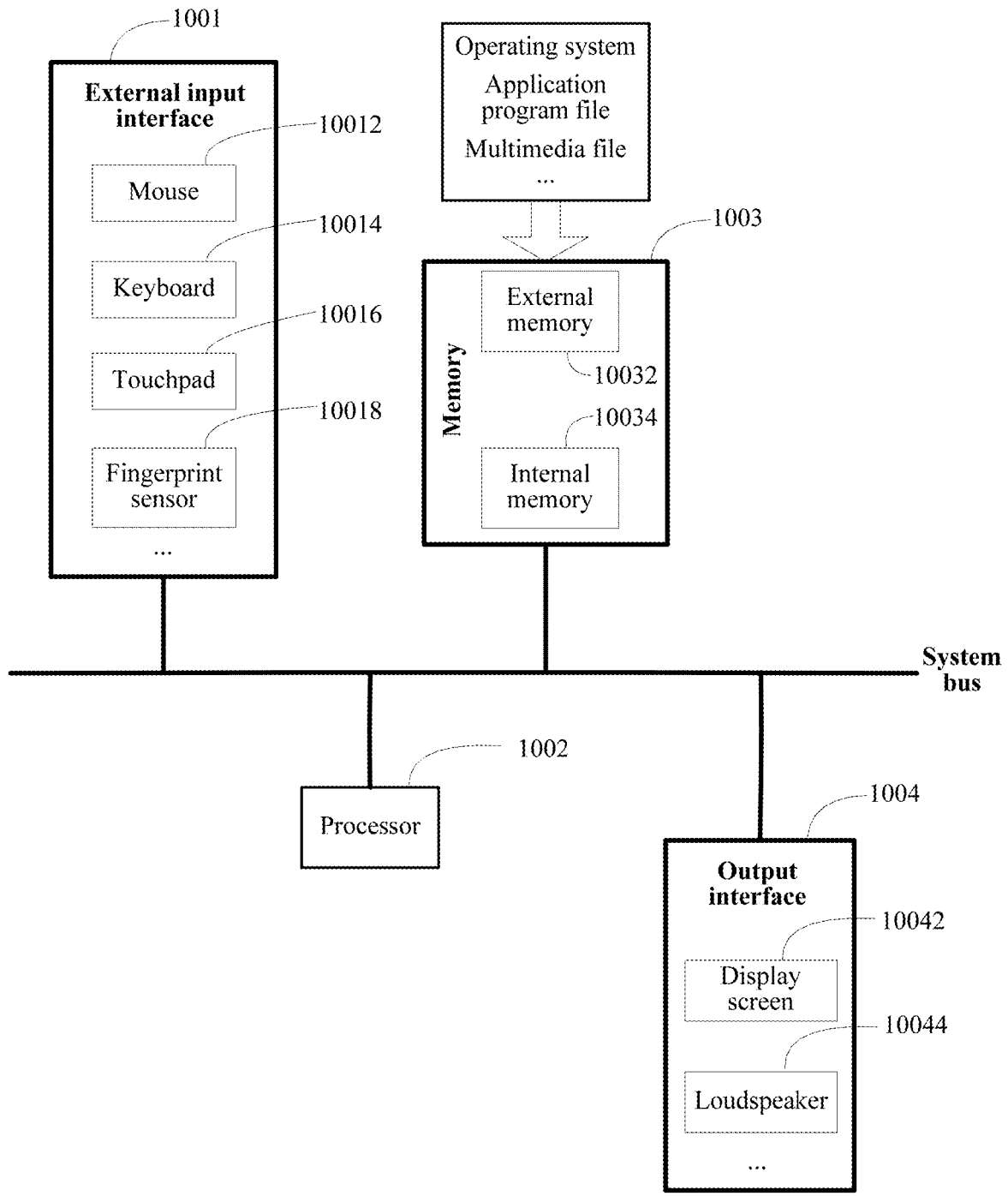
FIG. 9 is a schematic structural diagram of a computer device for performing the foregoing method for recognizing a fingerprint ridge point according to an embodiment.

In an embodiment, as shown in FIG. 9, FIG. 9 shows a computer system 10 that is based on the von Neumann architecture and performs the foregoing method for recognizing a fingerprint ridge point. The computer system 10 may be a terminal device such as a smartphone, a tablet computer, a palmtop computer, a notebook computer or a personal computer. Specifically, the computer system 10 may include an external input interface 1001, a processor 1002, a memory 1003, and an output interface 1004 that are connected through a system bus. The external input interface 1001 may optionally include at least one of a mouse 10012, a keyboard 10014, a touchpad 10016 or a fingerprint sensor interface 10018. The memory 1003 may include an external memory 10032 (for example a hard disk, an optical disk or a floppy disk) and an internal memory 10034. The output interface 1004 may include devices such as a display screen 10042 and a speaker 10044.

In this embodiment, the method is performed based on a computer program. A program file of the computer program may be stored in the external memory 10032 of the computer system 10 and is loaded to the internal memory 10034 when being run. The program file may then be compiled into machine code, and the machine code is transmitted to the processor 1002 and executed by the processor 1002. In this way, a logic module for receiving a fingerprint image 102, a module for acquiring a pixel direction 104, a module for selecting a reference pixel 106, and a module for determining a fingerprint ridge point 108 may be formed in the computer system 10, and implement their the functions as described in relation to FIG. 8. In addition, in a process of performing the method for recognizing a fingerprint ridge point, input parameters may all be received by using the external input interface 1001, transmitted to and cached in the memory 1003, and then input to the processor 1002 to be processed. Result data of processing may be cached in the memory 1003 for subsequent processing, or may be transmitted to the output interface 1004 for output.

What is disclosed above is merely preferred embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A method for recognizing a fingerprint ridge point, the method comprising:
   receiving a fingerprint image;
   performing orientation field estimation on the fingerprint image;
   identifying a target pixel in the fingerprint image;
   determining a ridge line including the target pixel and extending in a ridge direction, according to the orientation field estimation, and a normal line extending in a normal direction perpendicular to the ridge direction;
   defining a rectangular region by using the target pixel as a central point, a length of the rectangular region being along the ridge direction, a width of the rectangular region being along the normal direction, and the rectangular region including a first number of pixel rows arranged in the normal direction, wherein the defining includes:
      calculating an average ridge distance of the fingerprint image;
      determining the first number of pixel rows according to the average ridge distance;
   calculating a sum of grayscale values of pixels in each of the first number of pixel rows; and
   determining that the target pixel is a fingerprint ridge point when the sum of grayscale values corresponding to a pixel row that includes the target pixel is the smallest among the first number of pixel rows.

2. The method for recognizing a fingerprint ridge point according to claim 1, the method further comprises:
   setting, according to the first number of pixel rows, a second number of pixels included in each of the first number of pixel rows, wherein the second number is ⅓ to ⅔ of the first number.

3. The method for recognizing a fingerprint ridge point according to claim 1, wherein calculating the sum of grayscale values of pixels in each of the first number of pixel rows comprises:
   traversing the first number of pixel rows to identify a traversed pixel row as a target pixel row;
   determining grayscale values of pixels in the traversed pixel row that is used as the target pixel row and corresponding weight coefficients; and multiplying the grayscale values of the pixels in the traversed pixel row by the corresponding weight coefficients to obtain a weighted sum.

4. The method for recognizing a fingerprint ridge point according to claim 3, wherein values of weight coefficients of the pixels in the target pixel row decrease as distances from pixels to a central pixel in the target pixel row increase.

5. The method for recognizing a fingerprint ridge point according to claim 1, wherein after the step of identifying the target pixel in the fingerprint image, the method further comprises:
determining a grayscale value of the target pixel;
determining whether the grayscale value of the target pixel is greater than a threshold; and
if the grayscale value is greater than the threshold, determining that the target pixel is not the fingerprint ridge point.

6. An apparatus for recognizing a fingerprint ridge point, the apparatus comprising a memory and a processor coupled to the memory, the processor being configured to:
receive a fingerprint image;
perform orientation field estimation on the fingerprint image;
identify a target pixel in the fingerprint image;
determine a ridge line including the target pixel and extending in a ridge direction, according to the orientation field estimation, and a normal line extending in a normal direction perpendicular to the ridge direction;
define a rectangular region by using the target pixel as a central point, a length of the rectangular region being along the ridge direction, a width of the rectangular region being along the normal direction, and the rectangular region including a first number of pixel rows arranged in the normal direction, wherein the step to define the rectangular region includes
calculating an average ridge distance of the fingerprint image;
determining the first number of pixel rows according to the average ridge distance;
calculate a sum of grayscale values of pixels in each of the first number of pixel rows; and
determine that the target pixel is a fingerprint ridge point when the sum of grayscale values corresponding to a pixel row that includes the target pixel is the smallest among the first number of pixel rows.

7. The apparatus for recognizing a fingerprint ridge point according to claim 6, wherein the processor is further configured to:
set, according to the first number of pixel rows, a second number of pixels included in each of the first number of pixel rows, wherein the second number is ⅓ to ⅔ of the first number.

8. The apparatus for recognizing a fingerprint ridge point according to claim 6, wherein the processor is further configured to:
traverse the first number of pixel rows to identify a traversed pixel row as a target pixel row;
determine grayscale values of pixels in the traversed pixel row that is used as the target pixel row and corresponding weight coefficients; and
multiply the grayscale values of the pixels in the traversed pixel row by the corresponding weight coefficients to obtain a weighted sum.

9. The apparatus for recognizing a fingerprint ridge point according to claim 6, wherein the processor is further configured to:
determine a grayscale value of the target pixel;
determine whether the grayscale value of the target pixel is greater than a threshold; and
if the grayscale value is greater than the threshold, determine that the target pixel is not the fingerprint ridge point.

10. A non-transitory computer readable media containing program instructions, when executed by one or more processor, the programs instructions perform a method for recognizing a fingerprint ridge point, the method comprising:
performing orientation field estimation on a fingerprint image;
identifying a target pixel in the fingerprint image;
determining a ridge line including the target pixel and extending in a ridge direction, according to the orientation field estimation, and a normal line extending in a normal direction perpendicular to the ridge direction;
defining a rectangular region by using the target pixel as a central point, a length of the rectangular region being along the ridge direction, a width of the rectangular region being along the normal direction, and the rectangular region including a first number of pixel rows arranged in the normal direction, wherein the defining includes:
calculating an average ridge distance of the fingerprint image;
determining the first number of pixel rows according to the average ridge distance;
calculating a sum of grayscale values of pixels in each of the first number of pixel rows; and
determining that the target pixel is a fingerprint ridge point when the sum of grayscale values corresponding to a pixel row that includes the target pixel is the smallest among the first number of pixel rows.

11. The non-transitory computer readable medium according to claim 10, the method further comprises:
setting, according to the first number of pixel rows, a second number of pixels included in each of the first number of pixel rows, wherein the second number is ⅓ to ⅔ of the first number.

12. The non-transitory computer readable medium according to claim 10, wherein calculating the sum of grayscale values of pixels in each of the first number of pixel rows comprises:
traversing the first number of pixel rows to identify a traversed pixel row as a target pixel row;
determining grayscale values of pixels in the traversed pixel row that is used as the target pixel row and corresponding weight coefficients; and
multiplying the grayscale values of the pixels in the traversed pixel row by the corresponding weight coefficients to obtain a weighted sum.

13. The non-transitory computer readable medium according to claim 12, wherein values of weight coefficients of the pixels in the target pixel row decrease as distances from pixels to a central pixel in the target pixel row increase.

14. The computer readable medium according to claim 10, wherein after identifying the target pixel in the fingerprint image, the method further comprises:
determining a grayscale value of the target pixel;
determining whether the grayscale value of the target pixel is greater than a threshold; and
if the grayscale value is greater than the threshold, determining that the target pixel is not the fingerprint ridge point.

15. The method according to claim 1, further comprising:
subjecting the fingerprint image to illumination normalization to reduce impact of light.

16. The apparatus according to claim 6, wherein the processor is further configured to:
subject the fingerprint image to illumination normalization to reduce impact of light.

17. The non-transitory computer readable media according to claim 10, wherein the method further comprises:
subjecting the fingerprint image to illumination normalization to reduce impact of light.

* * * * *